United States Patent

Morgan

[15] 3,677,073
[45] July 18, 1972

[54] METHOD AND APPARATUS FOR EVALUATING METAL CLEANLINESS

[72] Inventor: Jack B. Morgan, Lower Burrell, Pa.

[73] Assignee: Allegheny Ludlum Industries, Inc., Brackenbridge, Pa.

[22] Filed: Jan. 27, 1971

[21] Appl. No.: 110,325

Related U.S. Application Data

[63] Continuation of Ser. No. 778,187, Nov. 22, 1968, abandoned.

[52] U.S. Cl................................................73/67.9
[51] Int. Cl. .................................................G01n 29/04
[58] Field of Search..................73/67.7, 67.8 R, 67.8 S, 67.9

[56] References Cited

UNITED STATES PATENTS

| 2,770,966 | 11/1956 | Halliday et al. | 73/67.9 |
| 2,984,098 | 5/1961 | Loos | 73/67.9 |
| 2,989,864 | 6/1961 | Bamford | 73/67.8 |
| 3,009,353 | 11/1961 | Erdman | 73/67.9 |
| 3,238,767 | 3/1966 | Clynes | 73/67.9 |

*Primary Examiner*—James J. Grill
*Attorney*—Vincent G. Gioia

[57] ABSTRACT

A method and apparatus for determining the presence, location and character of discontinuities in an otherwise homogeneous sample of material, e.g. a steel sample, by bombarding the sample with sonic energy in a controlled pattern, recording the reflection of energy from the sample and relating the reflection to locations on the sample.

4 Claims, 3 Drawing Figures

PATENTED JUL 18 1972  3,677,073

INVENTOR.
JACK B. MORGAN
By Howard A. Birenbaum
Attorney

METHOD AND APPARATUS FOR EVALUATING METAL CLEANLINESS

This application is a continuation of Ser. No. 778,187, filed 11—22—68, now abandoned.

BACKGROUND OF THE INVENTION

This invention relates to method and apparatus for testing material for discontinuities in its structure. More specifically this invention relates to method and apparatus for ultrasonic testing of steel samples to determine the presence, location and character of the discontinuities as an indication of the sample's "cleanliness." The term "cleanliness" herein used refers to the presence and severity of discontinuities such as inclusions of foreign material, cracks, tears, segregations, laminations and shrinkage in the test sample. Past methods and apparatus for rating steel cleanliness includes the Jernkontoret Metallographic Test, the Magnetic Particle Test and certain ultrasonic tests. All previously used techniques suffer from disadvantages which detract from their usefulness. Metallographic and magnetic testing are primarily surface tests and provide only very limited information from below the surface of the sample. In magnetic testing, some depth information is obtained but only through an expensive and time consuming cutting down of the sample. The magnetic particle test thus provides a multi-surface examination which must be performed at different depths through the sample. Conventional ultrasonic testing does provide limited subsurface information from the sample but only of a quantitative nature. As commonly used, ultrasonic testing equipment is coupled to electronic counters which record the number of signals responsive to reflected energy which exceed predetermined standard levels. The information thus gained relates only the numbers of reflections of various strength from the sample and no indication of distribution, location or character of the discontinuity causing the reflection.

SUMMARY OF THE INVENTION

The invention disclosed herein provides method and apparatus for determining the location and character of discontinuities in an otherwise homogeneous sample of material by scanning the sample with a bombardment of energy pulses in a controlled pattern over at least one surface area or side of a sample, generating an electrical signal responsive and in proportion to energy pulses reflected from the sample and recording information of the signal throughout the scanning period.

It is therefore an object of my invention to provide a method and apparatus for testing a sample of substantially homogeneous material for discontinuities within the sample by bombarding the sample with sonic energy and generating an electrical signal responsive and proportional to the reflected sonic energy.

A further object of my invention is to provide a method and apparatus to ultrasonically test for discontinuities in a sample and make a record thereof which can be used to indicate the presence, location and character of the discontinuities.

A still further object of my invention is to provide a method and apparatus for testing an otherwise homogeneous sample by ultrasonic means and to display electrical signals representative of discontinuities in the sample on a storage oscilloscope.

Another object of my invention is to provide a method and apparatus to test an otherwise homogeneous sample ultrasonically and to provide a permanent record thereof.

DESCRIPTION OF THE PREFERRED EMBODIMENT

Figure 1:
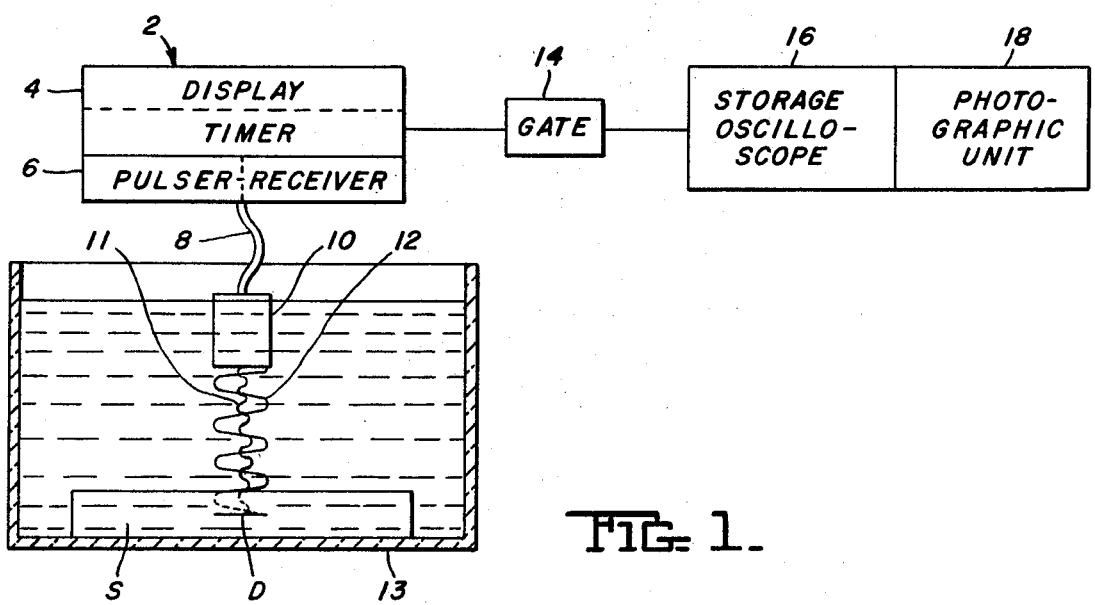
FIG. 1 is a block diagram of the testing apparatus in accordance with a preferred embodiment of the present invention.

Referring now to the drawings, reference numeral 2 on FIG. 1 indicates an ultrasonic testing device such as a UM Reflectoscope Model 700 manufactured by Automation Industries, Inc. of Danburry, Connecticut. Such a testing device 2 consists of two changeable elements, each having a dual function, which comprises a display timer 4 on the type 50B721 and a pulser/receiver 6 of the type Model 10 N. A coaxial cable 8 is connected to the pulser/receiver 6 and to a search unit 10, which in the preferred embodiment contains a 10 MHz lithium sulfate crystal and has a 8.5 inch focal length, such as is manufactured by Automation Industries, Inc. An outgoing sound wave 11 is produced by the search unit 10 which strikes discontinuity D and a portion of the wave is reflected as sound wave 12. The search unit 10 is driven by a scanning drive (not shown) and is immersed in a tank 13 of water above a sample S also immersed in the tank 13. Connected to the testing device 2 is a flaw alarm gate 14 such as a Transigate Type No. 50E550 by Automation Industries, Inc. Connected to output of the gate 14 is a storage oscilloscope 16, to which may be mounted photographic unit 18.

Figure 2:
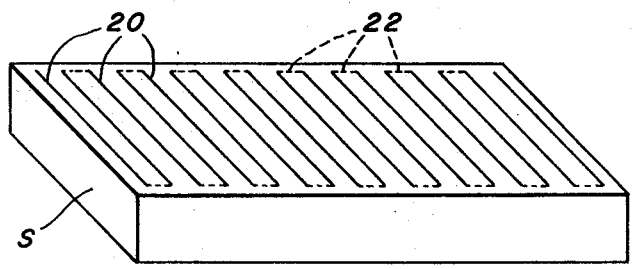
FIG. 2 is a pictorial view of the tested sample illustrating the scan pattern.

FIG. 2 shows the sample S and superimposed upon one surface thereof is the scan pattern of the search unit 10 for illustration purposes. The solid lines show the active sweep 20 of the unit 10 across the sample and the dotted lines 22 indicate the indexing of the search unit 10 for a subsequent active sweep back across the sample S over a previously unscanned area.

Figure 3:
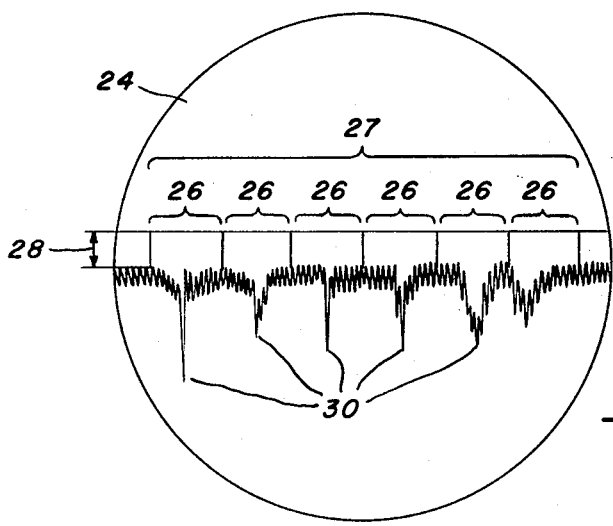
FIG. 3 is a drawing representative of the information presented on the screen of the storage oscilloscope.

FIG. 3 shows a typical diagram of the analog information displayed on the storage oscilloscope screen 24. The diagram shows single sweep information 26 in end-to-end relation for each of the several sweeps in the scan pattern, 27, an indication 28 of general noise level and the presence, magnitude and location of observed discontinuities which are indicated by numeral 30 and which are relatable to positions on the sample.

In conventional ultrasonic testing, a sound pulse is sent out from a source and caused to bombard and be transmitted through a test sample. Any interruption in the homogenity of the transmitting medium will act as a reflecting surface and some portion of the bombarding pulse will be reflected. The larger the interruptive surface the larger will be the amount of the reflected energy. Thus, in going from one medium to another as in passing into a test sample, there will be a reflection of sonic energy by the surface of the sample. So too, there will be a reflection from any irregularity within the sample which presents a reflecting surface. Therefore, discontinuities in the sample such as inclusions of foreign material, e.g. metallurgical inclusions, cracks, tears, segregations, laminations, and shrinkage will provide reflective surfaces and cause a return of sonic energy, the magnitude thereof being determined by the aspect of the reflecting surface.

In operation, the ultrasonic testing device 2 generates electrical pulses in the pulser section of pulser/receiver 6. The pulses are carried to the search unit 10 by cable 8 which are converted to sound pulses by the piezoelectric characteristic of the lithium sulfate crystal and are focused toward the sample. The outgoing sound wave 11 strikes the sample and a portion of the sound energy is reflected (not shown). The remaining portion of the wave continues through the sample and strikes discontinuity D. A portion of the wave is reflected by the discontinuity D forming reflected wave 12 and returns to the search unit 10 and is thereby received by the lithium sulfate crystal which converts the sonic energy back to an electrical signal. The electrical signal, which is proportional to sonic energy reflected by the discontinuity, is displayed on an oscilloscope in the display portion of the display/timer module 4. The timer section of that module keys the pulser and receiver function of module 6 and provides the output signal which is sent to the flaw alarm gate 14. In detection of discontinuities within a sample, the portions of the sonic pulse return which are from reflections without the sample contain no useful information. Flaw alarm gate 14 discriminates against a portion of the total reflective energy by blocking out information from signals which are reflected from without the sample. For example, in testing steel samples, the gate 14 is desirably adjusted to pass only signals resulting from at least 0.9 inch below the top surface of the sample S and no lower than 0.4 inch from the bottom surface of sample S. By so restricting the response, the effects of reflections of the surface of sample S upon the sonic reflections from within the samples are minimized. The gated signal is then applied to the input of the storage oscilloscope 16 which displays the response for each sweep of the entire scan in an end-to-end relation (FIG. 3). The signal information from gate 14 retains this characteristic in the storage oscilloscope and is displayed on the oscilloscope screen and a permanent record thereof may be made, for example, by photographing the displayed pattern with a suitable device 18.

The search unit 10 is driven so as to scan sample S in the uniform manner as shown in FIG. 2. The sweeps 20 may be oriented either transversely or longitudinally to the longitudinal axis of the sample, practical considerations of the examination govern the choice. Each individual sweep 20 is preferably begun and concluded approximately one-half inch from the edge of the sample S to avoid edge effects on the reflected energy. Upon the completion of an active sweep 20, an indexing of 0.05 inch from the previous sweep 20 is accomplished. This index may be varied to control the total time of the scan. The example described has been used with a sweep speed of 4 inches per second over a sample of between 2 and 4⅝ inches in width and 6 inches in length.

FIG. 3 shows the end-to-end relation of each display of the single sweep information 26 making up the scan. In each of the single sweep information segments 26 the extent of the general noise, shown as numeral 28, gives an indication of the presence of very small, non-concentrated reflective surfaces. The higher the noise level 28, the larger are the reflecting surfaces of the discontinuities or inclusions within the material reflecting the bombarding sonic energy. The more concentrated the presentation of the noise level 28, the more small discontinuities are there included within the sample. This information is not available in conventional ultrasonic counting systems, since such systems are incapable of discriminating size of discontinuities within the selected band. Moreover, small discontinuities detected by the system disclosed herein are generally below the lowest level selected for counting by existing systems. Also available on the face of the oscilloscope for each single sweep segment 26 is an indication of larger discontinuities 30 present within the sample. These are larger reflective surfaces within the sample S which provide individual response to sonic bombardment. Since these are individual discontinuities, their location upon the storage oscilloscope may be coordinated with the sweep 20 of the search unit 10 and the approximate location of these inclusions in the sample may be determined. Further, additional information of the extent of the discontinuity may be gained by noting the height of the indication and whether a comparable indication persists in adjacent sweeps.

It has been shown that discontinuities (being, for example, inclusions of small foreign materials or flaws in the sample) in an otherwise homogeneous sample of material may be detected, located and their number, size and extent evaluated by bombarding the sample with sonic energy and displaying an electrical signal responsive to the reflected sonic energy on a storage oscilloscope. It should be evident from the above that the information contained in the responsive electrical signal, being analog in nature could be recorded by any means responsive to a continuous signal. Further, other analog application of the information may be made, subject to the ability of the means to respond with a speed comparable to the generation of the information by the search unit scan, such as displaying the information as a graph on a mechanical recorder.

In order to develop information of the relative cleanliness of a sample so that it may be compared with a reference sample, it is preferable to establish a standard of calibration. To standardize testing equipment response for steel sample testing, a target object, for example a stainless steel ball, may be placed at the search unit focal length and bombarded. The controls of the testing device may be then adjusted to obtain a response on the testing device cathode-ray tube screen of desired magnitude.

It should also be noted that the search unit focal length may be varied according to the distance of the unit from the sample. An unfocused unit may be used with some sacrifice of resolution of the returning pulses in some particular applications.

Further, although the example described herein refers to 10 M Hz as a pulse frequency in the preferred embodiment, other frequency may be used, e.g. 5 M Hz. Theoreticaly, a higher frequency pulse will be reflected by smaller discontinuities.

While several embodiments of my invention have been shown and described, it will be apparent that other adaptations and modifications may be made without departing from the scope of the appended claims.

I claim as my invention:

1. A non-destructive testing method suitable for determining the location and character of discontinuities and flaws in a sample of otherwise substantially homogeneous material comprising the steps of: bombarding the sample with a beam of sonic wave energy comprising successive pulses of sonic wave energy and causing said beam to scan back and forth from edge to edge along one transverse dimension of the sample while causing the beam to advance through an increment at essentially right angles to said one transverse dimension after each scan, detecting pulses of sonic wave energy reflected from said sample as the beam scans back and forth, discriminating against a portion of the total reflected energy by blocking out energy reflected from those opposite surfaces of the sample extending transverse to the scanning beam, and causing a recording means to move over a recording surface along one dimension while deflecting said recording means at right angles to said one dimension as a function of the amplitude of said reflected energy, the recording means continually moving along said one dimension without reversing during a plurality of successive back and forth scans of the beam of sonic wave energy, whereby the location of flaws in said sample represented by points of increased amplitude recorded on said recording surface can be determined from a consideration of the location of said points of increased amplitude along said one dimension.

2. The method of claim 1 wherein said recording means moves over said recording surface at a speed less than the scanning speed of said beam of sonic wave energy.

3. The method of claim 1 wherein said recording means comprises an electron beam and said recording surface comprises the screen of a storage oscilloscope.

4. Apparatus for non-destructive testing suitable for determining the location and character of discontinuities in addition to flaws in a sample of otherwise homogeneous material, comprising means for bombarding said sample with a beam of sonic wave energy comprising successive pulses of sonic wave energy, means for deflecting said beam to cause it to scan back and forth from edge to edge along one transverse dimension of the sample while causing the beam to advance through an increment at essentially right angles to said one transverse dimension after each scan, means for detecting pulses of sonic wave energy reflected from said sample as the beam scans back and forth, means coupled to said detecting means for discriminating against a portion of the total reflected wave energy by blocking out energy reflected from those opposite surfaces of the sample extending transverse to the scanning beam, a storage oscilloscope, and means coupling said discriminating means to said storage oscilloscope to cause the electron beam thereof to be deflected in one direction as a function of the amplitude of said reflected energy while causing said beam to move continuously and without reversing along a dimension at right angles thereto during a plurality of successive back and forth scans of the beam of sonic wave energy, whereby the location of flaws in said sample represented by points of increased amplitude in the trace recorded on the screen of said storage oscilloscope can be determined from a consideration of the location of said points of increased amplitude along said other dimension.

* * * * *